Patented Oct. 3, 1944

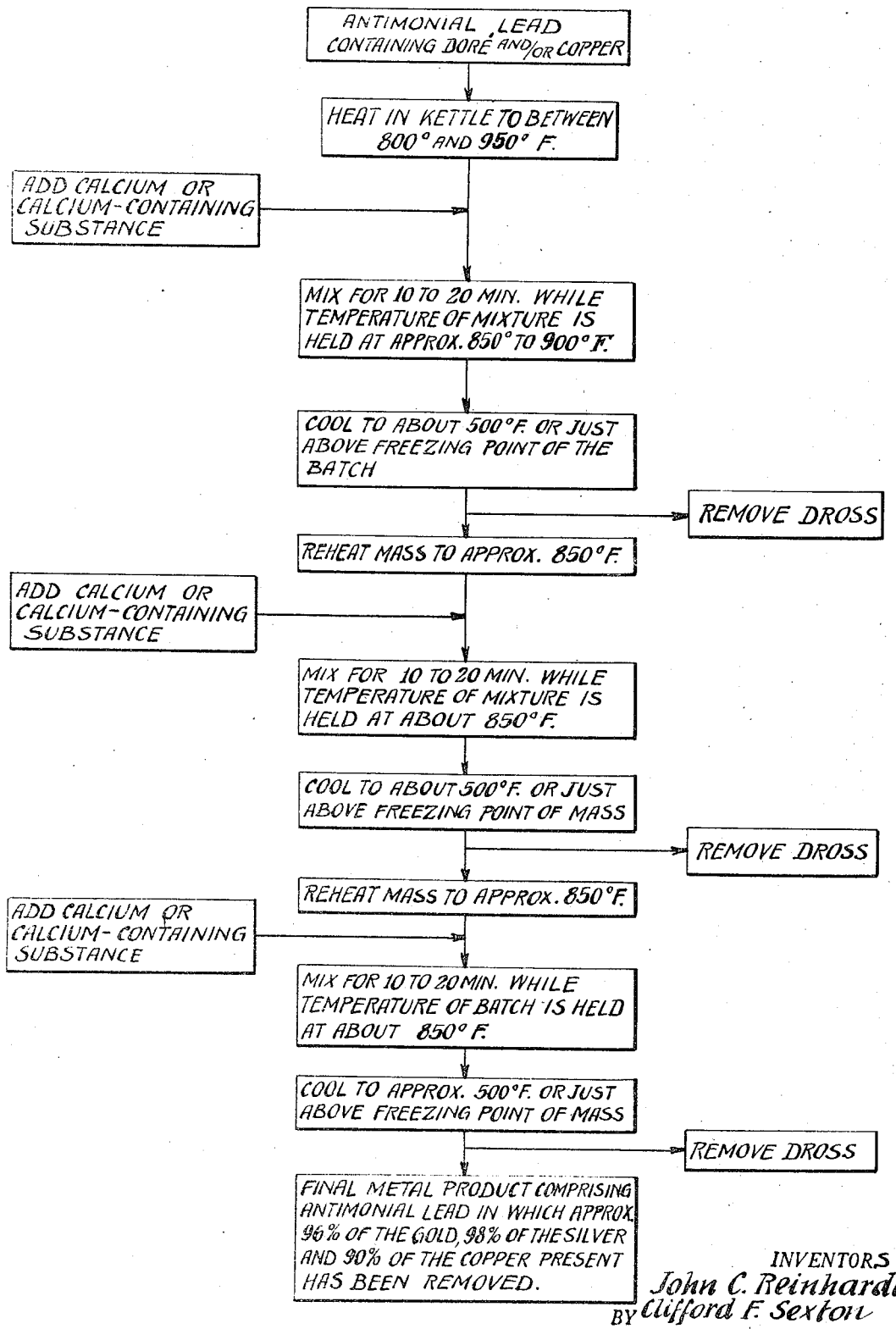

2,359,718

UNITED STATES PATENT OFFICE 2,359,718

PROCESS OF REFINING METALS

John C. Reinhardt and Clifford F. Sexton, Omaha, Nebr., assignors to American Smelting and Refining Company, New York, N. Y., a corporation of New Jersey Application February 28, 1942, Serial No. 432,880

9 Claims. (Cl. 75—78)

This invention relates to the refining of metals and more particularly to the removal of doré and/or copper from lead containing antimony. The invention is especially useful in the treatment of antimony-lead eutectic metals but is also applicable for treating other antimonial lead alloys to effect the removal of gold, silver and copper.

Heretofore, antimony-lead eutectic metals and other antimonial leads, containing doré in any appreciable quantity, have been softened and de-silverized by the well known Parkes or Pattinson processes. The direct refining cost of antimony-lead eutectic metal is very high and there is considerable loss of antimony incurred by retreating the softener skims produced.

We have discovered, after considerable experimentation, that doré and copper can be quickly and economically separated from antimony-lead metal by the use of calcium. The process satisfies a long felt need for a process of removing doré and copper from antimony-leads with a minimum loss of antimony.

In accordance with the present invention, gold, silver and copper, when present, are removed by adding calcium, preferably in the form of calcium-lead alloys, to molten antimony-lead metal containing doré and/or copper, mixing the metal to react the same therewith, cooling the bath to just about its freezing point, and skimming the calcium dross which contains the precious metal values and copper.

The accompanying flow sheet illustrates the preferred procedure but it will be understood that variations of the process shown may be made, as hereinafter described without departing from the spirit and scope of our invention.

The following specific examples serve to further describe the process:

Example 1

A charge was made up of 155 lbs. of antimony-lead metal containing 14% antimony, 0.38 oz./ton gold and 17.2 oz./ton silver and heated to 825° F. to form a homogeneous molten mass. Calcium in the form of calcium-lead alloy (3.7% Ca and balance Pb) was added in the amount equal to 0.78 lb. calcium or approximately 21 lbs. of calcium-lead alloy. The mixture was then mixed for fifteen minutes at a temperature of 825° F. Thereafter the batch was allowed to settle and the dross removed. About 25 lbs. of dross was removed. After repeated stirring and drossing at temperatures of 700° F., 600° F., and 500° F., the final antimony-lead product comprising 134.5 lbs. analyzed 12.4% antimony, gold 0.02 oz./ton and silver 7.6 oz./ton. This procedure removed 95.4% of the gold and 61.7% of the silver.

Example 2

A charge made up of 150 lbs. of antimony-lead metal containing 14% antimony, 0.38 oz./ton gold and 17.2 oz./ton silver was heated to 950° F. and to the molten mass was added 20 lbs. of calcium-lead alloy as in Example 1. After introducing the calcium alloy, the melt was held at 850° F. for 10 minutes while mixing the same and then the temperature was raised to 950° F. and held at that temperature for 1 hour. Thereafter the melt was drossed. This dross weighed about 50 lbs. After drossing the batch was reheated to 950° F. and an additional 7 lbs. of calcium-alloy added. After mixing the batch for 10 minutes at 950° F. the melt was allowed to stand for 1 hour at that temperature and then the dross was skimmed off. The final antimony-lead product contained 10.8% antimony, calcium 0.26%, gold 0.05 oz./ton and silver 4.0 oz/ton. By this treatment 91% of the gold was removed and 84% of the silver.

Example 3

One hundred twenty lbs. of antimony-lead alloy containing 14% antimony, 0.38 oz./ton gold and 17.2 oz./ton silver was heated to 850° F. and 3.5 lbs. of calcium-lead alloy, as in Example 1, was stirred into the molten mass. After mixing the batch for 15 minutes at 850° F., the mixture was permitted to cool to 500° F. and the dross was removed. In this case about 8.5 lbs. of dross was separated from the melt. Thereafter the melt was reheated to 850° F. and 7 lbs. of calcium-lead alloy added similarly as in the first instance. The batch was mixed for 15 minutes at 850° F. then allowed to cool to 500° F. and drossed. Following this the melt was reheated to 850° F. and an additional 7 lbs. of calcium-lead alloy introduced. After mixing the batch for 15 minutes at 850° F. it was allowed to cool to 500° F. After drossing a final antimony-lead product was left containing 11.9% antimony, 0.33% calcium, 0.02 oz./ton gold and 2.1 oz./ton silver.

In this case 96% of the gold and 98.6% of the silver was removed.

Example 4

One hundred lbs. of antimony-lead metal containing 12% antimony, 0.38 oz./ton gold and 17.2 oz./ton silver was heated to 600° F. and 17 lbs. of calcium-lead alloy as in Example 1 was stirred into the melt and the stirring was continued for 20 minutes while the melt was retained heated to 600° F. Following this the stirrer was removed and the batch heated to 950° F. at which temperature it was held for ½ hour. The dross formed on the melt was removed and the melt allowed to cool down to 500° F. after which any dross formed was skimmed from the melt. The final metal product analyzed 11.3% antimony, 0.05 oz./ton gold, 4.5 oz./ton silver and balance lead. In this case 89% of the gold was separated and 79% of the silver.

*Example 5*

Sixty-four and seven tenths tons of antimony-lead metal containing 14.4% antimony, 0.32 oz./ton gold, 15.6 oz./ton silver, 0.10% copper and 0.04% bismuth was heated to between 850°–900° F. To this melt was added 5 tons of calcium-lead alloy as in Example 1, and after stirring this mixture vigorously for 20 minutes while the batch was heated at 850°–900° F., it was permitted to settle and the dross removed. The calcium dross which separated, and which was allowed to solidify in the form of blocks or cakes, weighed approximately 6 tons. Thereafter the melt was heated between 850°–900° F. and an additional 5.2 tons of calcium-alloy introduced and the melt stirred for 20 minutes, then cooled to 550° F. and the dross removed. Following this sufficient amount of lead chloride was added to the melt to bring about an exchange of calcium with lead and the removal of calcium as calcium chloride. The final antimony-lead product analyzed 12.1% antimony, 0.01 oz./ton gold, 3.8 oz./ton silver, calcium 0.04% and bismuth 0.01%. The gold removed amounted to 97.1%; silver 77.8% and copper 90.9%.

*Example 6*

Sixty-one and six tenths tons of antimony-lead metal containing 14.0% antimony, 0.37 oz./ton gold and 17.4 oz./ton silver was heated to between 850°–900° F. To this melt was introduced 16 tons of calcium dross in the form of blocks from previous charge and after stirring the mixture for 20 minutes while the batch was heated from 850°–900° F., it was allowed to stand for a few minutes and then the dross was skimmed off. After drossing, 5¼ tons of calcium-lead alloy, as in Example 1, was added to the melt and mixed for 20 minutes with the temperature of the melt being held between 850°–900° F. The dross was then removed from the melt and 3.8 tons calcium-lead alloy added and after stirring the mixture for another 20 minutes at 850°–900° F., the batch was permitted to cool down to around 550° F. and the dross was then skimmed off.

The thus treated melt contained an appreciable amount of calcium and in order to remove the same lead chloride was added in amount calculated to be slightly in excess of the quantity needed to react with the calcium to form calcium chloride. After removal of dross comprising calcium and lead chloride the final metal product analyzed 11.0% antimony, 0.02 oz./ton gold, 3.5 oz./ton silver and the balance lead. The gold and silver removed as calculated on the original batch content amounted to 95.1% and 81.9% respectively.

The process of this invention is also applicable for treating the calcium desilverization dross separated from the antimony-lead metal as described in Examples 1 to 6. A typical method of effecting this is illustrated as follows:

*Example 7*

A suitable charge of calcium desilverization dross recovered as dross after introducing calcium-alloy to antimony-lead metal was melted in a suitable receptacle and lead chloride added in amount to react with the calcium to form calcium chloride. After separating out the lead and calcium chloride formed, the metal melt was heated to between 850° and 900° F. and calcium dross such as that obtained in 1st and 2nd dross of Example 3 containing approximately 40 oz./ton doré was added. The mixture was stirred for about 15 minutes while heated to between 850°–900° F. Thereafter the batch was allowed to cool to about 500° F. and then the dross was skimmed off. The melt was then reheated to between 850° and 900° F. and calcium-lead alloy was added, corresponding to approximately .33% of the original starting desilverization dross batch weight, and after mixing for about 15 minutes at 850° to 900° F. the mixture was permitted to cool to 500° F. After removal of the dross formed, the final metal analyzed as lead containing 11.5% antimony, 0.02 oz./ton gold and 7.7 oz./ton silver. In this instance 93.8% of the gold and 81.2% of the silver was removed.

Instead of using calcium-alloy, calcium blocks obtained from previous charges may be used. This procedure is illustrated in the following example:

*Example 8*

Fifty-eight and seven tenths tons of antimony-lead metal containing 13.2% antimony, 0.30 oz./ton gold, 14.5 oz./ton silver and 0.06% copper was treated similarly as described in Example 6. For each of the three calcium additions, calcium dross in the form of blocks from previous charges were used instead of calcium-lead alloy. The final metal product after removing the calcium with lead chloride analyzed 12.5% antimony, 0.03 oz./ton gold, 5.8 oz./ton silver and 0.005% copper. This showed a removal of 90% of the gold, 60% of the silver and 92% of the copper.

It will thus be appreciated that the process of this invention provides a simple and economical method of removing doré, as well as copper from antimonial-leads. By our process recoveries of 95% gold and over 80% silver are obtained and where copper is present, over 90% of it is removed. The drop in antimony content is due principally to dilution with calcium-alloy. High temperature melts tend to give better silver recoveries, but a temperature high enough to cause oxidation of calcium is to be avoided. We have found that utilizing temperatures of 850° to 900° F. while mixing and reacting the calcium ingredient with subsequent cooling to just above the freezing point on removal of the final dross gives very good results. The process is significant in that it provides a quick and efficient method for refining antimony-leads with a minimum loss of antimony.

What is claimed is:

1. The process of removing metals of the group consisting of doré and copper from antimony-lead alloys in approximately eutectic proportions which comprises reacting a molten bath of said metal with calcium metal material to form a dross with the doré and copper in the molten bath, and removing the resulting dross which contains substantially all the gold and silver values and copper to recover an antimonial lead alloy which is substantially free of doré and copper.

2. The process of removing metals of the group consisting of doré and copper from antimonial lead alloys containing lead and antimony in approximately eutectic proportions which comprises the steps of heating a batch of said metal to form a molten bath, introducing calcium lead metal material into the molten metal bath, reacting the same therewith and removing the dross formed with a minimum amount of antimony which dross contains the major part of the doré and copper originally present.

3. The process of removing doré and copper, when present, from antimony lead eutectic metal alloys comprising forming a molten bath of the said antimonial-lead-eutectic metal, adding calcium as calcium-lead alloy metal to the molten metal bath and reacting the metal therewith, thereby producing a calcium dross which contains the greater part of the doré values and copper, and removing the said dross from the metal bath to recover an antimonial lead product substantially free from doré and copper.

4. The process of removing doré and copper, when present, from antimony lead alloys in approximately eutectic proportions comprising forming a molten bath of the said antimony-lead metal, introducing calcium-lead alloy therein, mixing the molten bath and added calcium metal ingredient to produce a dross containing calcium and doré and copper, and separating the dross therefrom to remove calcium doré and copper from the antimony-lead metal with a minimum loss of the antimony constituent.

5. The process of removing precious metal values, including copper, from antimonial lead metal alloys containing about 12 to 14% antimony with the balance principally lead, which comprises forming a molten bath of said antimonial lead metal, introducing calcium-lead alloy material into the molten bath of metal, maintaining the bath at reactive temperature with the calcium ingredient to cause the formation of a dross and removing the dross formed to produce a final antimonial lead alloy product from which most of the doré metal constituents and copper have been removed with a minimum loss of antimony.

6. The process of removing precious metal values, including any copper present, from antimonial lead metal alloys containing about 12 to 14% antimony with the balance principally lead, which comprises forming a molten bath of said antimonial lead metal, introducing metal of the group consisting of calcium and calcium-lead alloy material into the molten bath of metal, maintaining the bath at reactive temperature with the calcium ingredient, and removing the dross formed, repeating the calcium addition with subsequent drossing removal until the content of doré and copper of the antimony-lead metal has been reduced to the desired point and wherein the antimony content of the antimonial lead metal treated is not markedly lowered.

7. The process of removing metals of the group consisting of doré and copper from antimonial lead eutectic metal alloy which comprises forming molten bath of said metal by heating the same to between 800° and 950° F., introducing metal of the group consisting of calcium and calcium-lead alloy into the molten metal bath and mixing the ingredients while maintaining the temperature of the bath at about 850° F., cooling the molten bath mixture to around 500° F. and removing the dross, reheating the metal bath to approximately 850° F. and repeating the addition of calcium material with subsequent cooling to just above its freezing point and separating the dross formed until a final antimonial-lead alloy product is produced from which the doré and copper has been removed or substantially reduced without substantially lowering the antimony constituent originally present.

8. In the process of removing metals of the group consisting of doré values and copper from antimony lead metal in approximately eutectic proportions the steps of adding metal of the group consisting of calcium and calcium-lead alloy material to a molten bath of said metal, mixing the calcium into the metal to thoroughly react the same therewith, cooling the molten metal bath to just above its freezing point, and skimming the calcium dross therefrom which contains the doré values and copper without removing substantial amounts of antimony.

9. In the process of removing doré values, including copper when present, from antimonial lead eutectic metal alloys containing about 12 to 14% antimony without substantially decreasing the antimony content, the steps of adding metal of the group consisting of calcium and calcium-lead alloy to a molten bath of said metal, mixing the calcium into the metal bath to thoroughly react the same with the calcium, cooling the molten metal bath to just above its freezing point, skimming the calcium dross therefrom which contains the doré values and copper, adding lead chloride to the molten metal bath to react with the calcium remaining in the molten metal and separating the lead and calcium chlorides therefrom to produce a refined antimonial-lead alloy product.

JOHN C. REINHARDT.
CLIFFORD F. SEXTON.